United States Patent
Padeski

(10) Patent No.: US 7,489,477 B1
(45) Date of Patent: Feb. 10, 2009

(54) DELAYED LIMITER POSITIONING IN SUSPENSION MANUFACTURE

(75) Inventor: Jason Padeski, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 646 days.

(21) Appl. No.: 11/102,092

(22) Filed: Apr. 8, 2005

Related U.S. Application Data

(60) Provisional application No. 60/654,291, filed on Feb. 15, 2005.

(51) Int. Cl.
*G11B 5/48* (2006.01)
(52) U.S. Cl. .................................................. 360/245.7
(58) Field of Classification Search .............. 360/234.6, 360/234.7, 244.2, 245.6, 245.7
See application file for complete search history.

(56) References Cited

U.S. PATENT DOCUMENTS

| | | | | |
|---|---|---|---|---|
| 6,046,883 A | * | 4/2000 | Miller | 360/245.7 |
| 6,292,333 B1 | * | 9/2001 | Blumentritt et al. | 360/254.8 |
| 6,388,843 B1 | * | 5/2002 | Takagi et al. | 360/245.7 |
| 6,424,498 B1 | * | 7/2002 | Patterson et al. | 360/245.7 |
| 6,965,501 B1 | * | 11/2005 | Pan et al. | 360/245.7 |
| 6,980,400 B2 | * | 12/2005 | Girard | 360/245.7 |
| 7,137,187 B2 | * | 11/2006 | Pan et al. | 29/603.03 |

* cited by examiner

*Primary Examiner*—Angel A. Castro
(74) *Attorney, Agent, or Firm*—Intellectual Property Law Office of Joel D. Voelzke

(57) ABSTRACT

Static attitude (SA) adjustment of a disk drive suspension load beam is conducted before final alignment of a limiter to increase adjustment range, to avoid limiter damage, and to minimize unintended distortion of parts during adjustment. To have the SA adjustment before final alignment of the suspension, the limiter is carried by the load beam beam portion in first position in which the limiter is out of operative association with the flexure tongue during static attitude adjustment. The limiter is shifted into operative association with the tongue only following the static attitude adjustment, typically in a plane being generally parallel with the tongue plane.

20 Claims, 3 Drawing Sheets

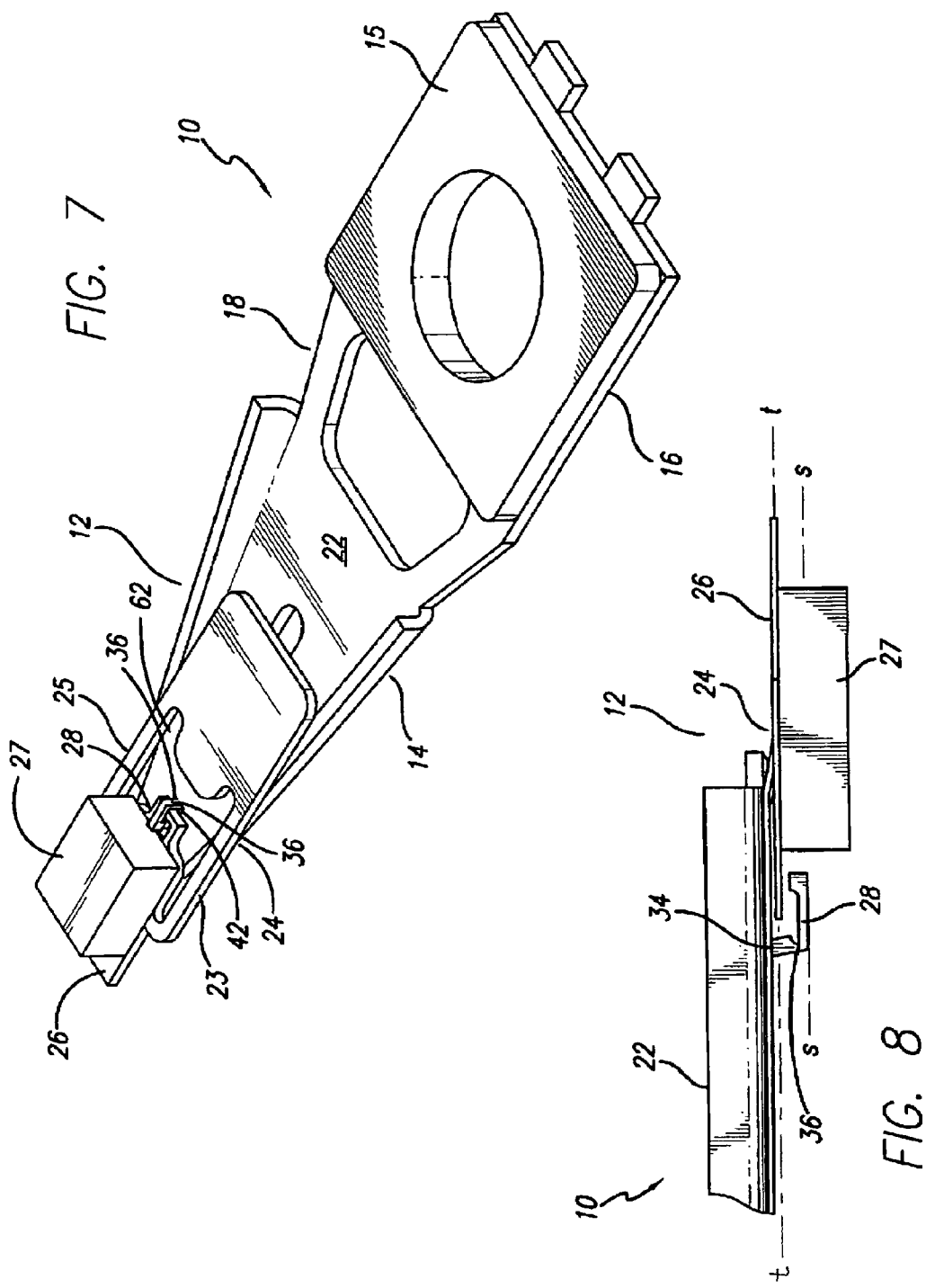

DELAYED LIMITER POSITIONING IN SUSPENSION MANUFACTURE

CROSS-REFERENCE TO RELATED APPLICATIONS

This application claims the benefit of U.S. Provisional Application Ser. No. 60/654,291 filed Feb. 15, 2005.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to improvements in static attitude (SA) adjustment of disk drive suspensions. In the invention the forming of the limiters (which limit flexure tongues from undue travel away from the load beam supporting the flexure) is post-process. That is, the specific adjustments of the suspension to bring its static attitude properties into compliance with specifications are conducted first, before final shaping/positioning of the limiter. This departure from the typical practice of fashioning the limiter and then performing SA adjustments obviates problems found in trying to make final static attitude adjustments with the limiter in its final position and has benefits such as an increase in suspension attitude adjustment range, avoidance of limiter damage, and minimization of unintended distortion of parts during adjustment. To have the SA adjustment before final alignment of the suspension, the limiter is carried by the load beam beam portion in first position in which the limiter is out of operative association with the flexure tongue during static attitude adjustment. The limiter is shifted into operative association with the tongue only following the static attitude adjustment, typically in a plane being generally parallel with the tongue plane.

2. Description of the Related Art

As noted, typically, the suspension limiter is positioned in its final position, operatively associated with the flexure tongue, and static attitude adjustments made with the limiter thus positioned.

BRIEF SUMMARY OF THE INVENTION

It is an object of the invention to provide novel and improved methods of manufacturing disk drive suspensions. It is a further object to provide an improved disk drive suspension in which static attitude adjustment has not compromised the limiter or the suspension. A still further object is to provide a method and a product in which static attitude adjustment is conducted after pre-forming the load beam and limiter and before final forming of the suspension. Yet another object is to form a suspension having a flexure with a cantilevered tongue and a limiter initially out of operative association with the tongue, the limiter then being adjusted into tongue operative association following static attitude adjustment of the suspension. "Operative association" herein refers to the degree of proximity (without necessarily touching) and the relative orientation needed to have the limiter engage the tongue against undue travel without interfering with the normal gimballing movement of the flexure tongue and the slider carried thereon.

These and other objects of the invention to become apparent hereinafter are realized in the method of manufacturing a disk drive suspension comprising a load beam and a flexure supported by the load beam, the flexure having a cantilevered tongue, that includes forming a limiter in the load beam in a first position beyond operative association with the tongue, supporting the flexure on the load beam with the limiter in the first position, static attitude adjusting the suspension, and thereafter bringing the limiter into a second position in operative association with the tongue.

In this and like embodiments, typically, the method includes adjusting the limiter along its length to bring the limiter into the second position, defining an aperture in the flexure through which the limiter can be adjusted from its first to its second position, and providing a tongue engaging tip on the limiter.

In a further embodiment the invention provides a method of manufacturing a disk drive suspension comprising a load beam and a flexure supported by the load beam, the flexure having a cantilevered tongue extending in a first plane, including a forming a limiter in the load beam in a first position beyond operative association with the tongue and extending in a second plane not parallel to the first plane, supporting the flexure on the load beam with the limiter in the first position, static attitude adjusting the flexure, and thereafter bringing the limiter into a second position in operative association with the tongue and generally in a third plane generally parallel with the tongue first plane.

In this and like embodiments, typically, the method further includes adjusting the limiter along its length to bring the limiter from the second plane into the second position and the third plane, defining an aperture in the flexure through which the limiter can be adjusted to its second position and its third plane, and providing a tongue engaging tip on the limiter.

The invention apparatus comprises a disk drive suspension comprising a load beam having a base portion, a hinge portion and a beam portion, and a flexure supported by the beam portion having a cantilevered tongue, the suspension being subject to static attitude adjustment, a limiter carried by the beam portion in a first position out of operative association with the tongue during the static attitude adjustment, the limiter being shiftable into operative association with the tongue in a second position following the static attitude adjustment.

In this and the following and like embodiments, typically, the flexure is separately formed and weld-supported on the beam portion, the limiter is integrally formed from the material defining the beam portion, the flexure comprises a proximate region supported on the beam portion, a distal region, and left and right struts extending between the proximate and distal regions, the tongue being cantilevered from the distal region and defining a limiter contact locus, the limiter contact locus includes a limiter receiving opening, and the limiter has a deflected tip adapted to engage the limiter receiving opening.

In a further embodiment, the invention provides a disk drive suspension comprising a load beam having a base portion, a hinge portion and a beam portion, and a flexure supported by the beam portion having a cantilevered tongue extending in a first plane, the suspension being subject to static attitude adjustment, a limiter carried by the beam portion in first position in a second plane in which the limiter is out of operative association with the tongue in its the first plane during the static attitude adjustment, the limiter being pivotally shiftable to a third plane and into operative association with the tongue in a second position following the static attitude adjustment, the third plane being generally parallel with the first plane.

In this and like embodiments, typically, the flexure is separately formed and weld-supported on the beam portion, the limiter is integrally formed from the material defining the beam portion, the flexure comprises a proximate region supported on the beam portion, a distal region, and left and right struts extending between the proximate and distal regions, the tongue being cantilevered from the distal region in the first plane and defining a limiter contact locus, the limiter contact locus includes a limiter receiving opening, and the flexure has an aperture through which the limiter can be adjusted to its second position and third plane.

BRIEF DESCRIPTION OF THE SEVERAL VIEWS OF THE DRAWINGS

The invention will be further described in conjunction with the attached drawings in which:

FIG. 7 is an oblique view of the invention suspension including the assembled load beam, flexure and limiter; and, FIG. 8 is a fragmentary side view thereof.

DETAILED DESCRIPTION OF THE INVENTION

Figure 1:
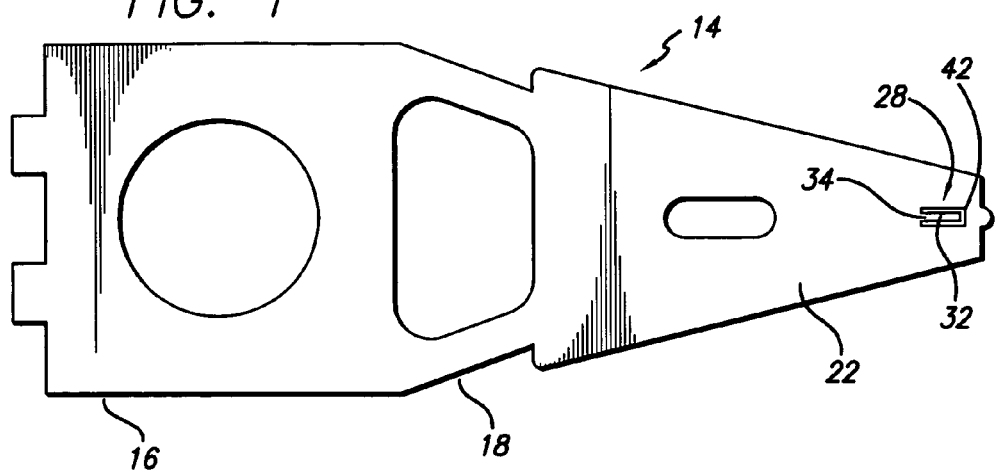
FIG. 1 is a plan view of the invention suspension load beam.
Figure 2:
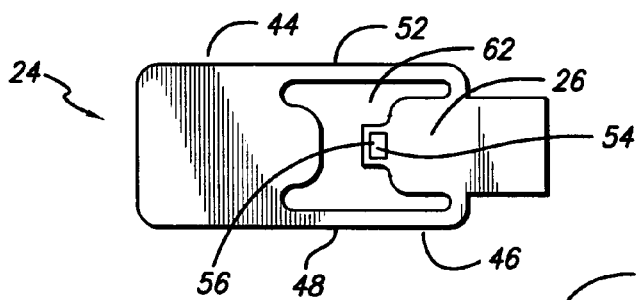
FIG. 2 is a plan view of the flexure therefor.
Figure 3:
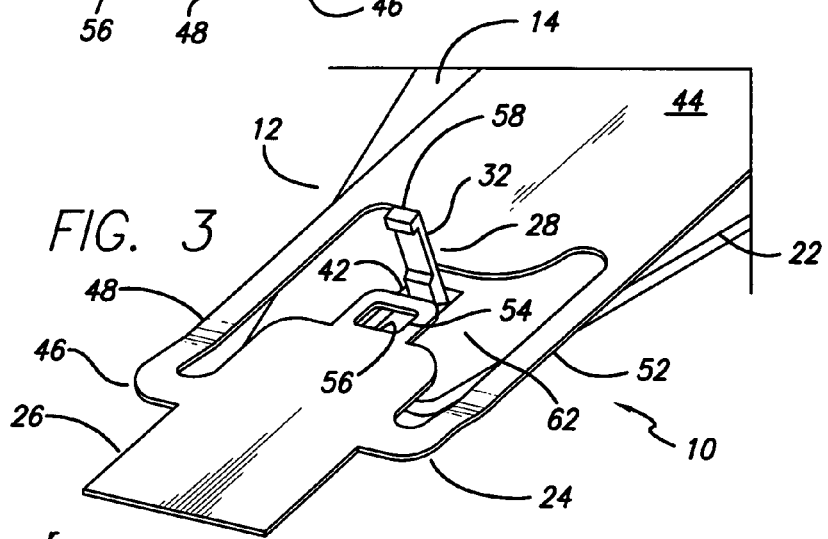
FIG. 3 is an oblique view of the assembled load beam and flexure, the limiter being out of operative association with the flexure tongue.
Figure 4:
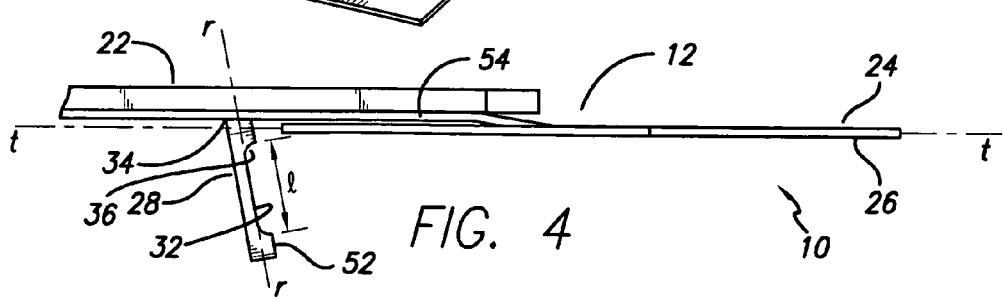
FIG. 4 is side elevation view of the assembled load beam and flexure (inverted), the limiter being out of operative association with the flexure tongue.

With reference now to the drawings in detail, in FIGS. 1-4, 7 and 8, the invention apparatus 10 comprises a disk drive suspension 12 comprising a load beam 14 having a base portion 16, a hinge portion 18 and a beam portion 22. A flexure 24 is supported by the beam portion 22. Flexure 24 has a cantilevered tongue 26 that is subject to excursion limits by a limiter 28 (FIGS. 7 and 8).

Suspension 12 is subject to static attitude adjustment to meet specifications by bending or twisting the flexure 24 e.g. at points 23, 25, FIG. 7. A limiter 28 in final position can interfere with this adjustment or be damaged during adjustment. Thus, in the invention, the limiter 28 shown carried by the beam portion 22 is initially kept in a first position (FIGS. 3 and 4) out of operative association with the tongue 26 during the static attitude adjustment.

Figure 5:
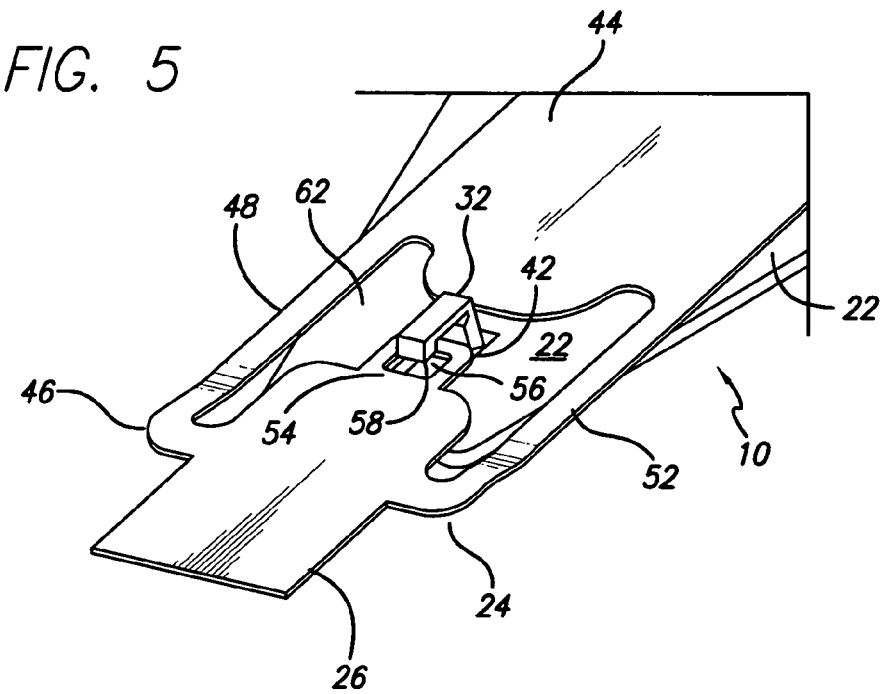
FIG. 5 is an oblique view of the assembled load beam and flexure, the limiter being in operative association with the flexure tongue.
Figure 6:
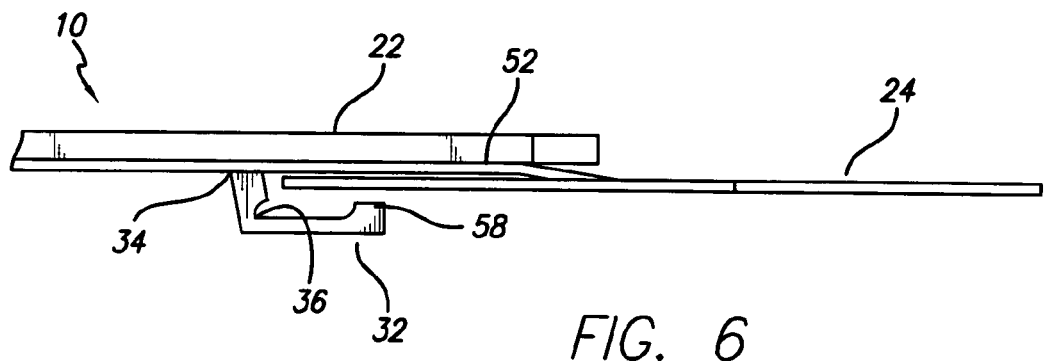
FIG. 6 is a side elevation view of the assembled load beam and flexure (inverted), the limiter being in operative association with the flexure tongue.

Limiter 28 comprises a finger like extension of the beam portion 22 formed typically by selective etching of the beam portion (FIG. 1) to be an elongated member 32 having a length l and joined in bendable relation at 34 to the beam portion. At first, arranged limiter member 32 is angled sharply from the beam portion 22 and the tongue 26 and is not in operative association with the tongue. At 36 along its length l, the limiter member 28 is reduced in thickness to preferentially bend for purposes of folding there to parallel the flexure tongue 26 (FIGS. 5 and 6). In this final position, the limiter 28 is in operative association with the flexure tongue 26. Between the initial and final positioning of the limiter 28, any necessary static attitude adjustments of the suspension are effected.

Typically, the flexure 24 is separately formed (FIG. 2) from and weld-supported on the beam portion 22. Limiter 28 is integrally formed from the material defining the beam portion 22 as an elongated portion thereof extending in the beam opening 42 before deflections (FIGS. 3 and 4) during the suspension assembly process.

Flexure 24 comprises a proximate region 44 supported on the beam portion 22, a distal region 46, and left and right struts 48, 52 extending between the proximate and distal regions. Flexure tongue 26 is typically cantilevered from the distal region 46 and defines a limiter 28 contact locus 54. Limiter contact locus 54 includes a limiter receiving opening 56, the limiter tip 58 being adapted to engage the limiter receiving opening to assist in keeping the limiter 28 and tongue 26 engaged during limiting action.

In further detail, and with added reference to FIG. 8, the invention disk drive suspension 12 comprises the load beam 14 having base portion 16, spring or hinge portion 18, beam portion 22, and flexure 24 supported by the beam portion and having cantilevered tongue 26 extending in a first plane t-t. Limiter 28 formed in and carried by the beam portion 22 initially assumes a first position (FIG. 4) in a second plane r-r in which the limiter is out of operative association with the tongue 26 in its the first plane t-t during static attitude adjustment. Subsequent to the static attitude adjustment, the limiter is shifted to a third plane s-s and into operative association with the tongue in a second position (FIG. 8) following the static attitude adjustment, the third plane s-s being generally parallel with the first plane t-t. Tongue 26 defines limiter contact locus 54 that is shown to include limiter receiving opening 56. Further, flexure 24 has an aperture 62 through which the limiter can be adjusted from its first position in the second plane r-r to its second position in third plane s-s.

The invention method of manufacturing disk drive suspension 12 comprising a load beam 14, a mount plate 15, and a flexure 24 supported by the load beam and having cantilevered tongue 26 supporting a slider 27, including forming a limiter 28 in the load beam in a first position beyond operative association with the tongue, supporting the flexure on the load beam with the limiter in the first position, static attitude adjusting the suspension, and thereafter bringing the limiter into a second position in operative association with the tongue.

Typically, the method includes adjusting the limiter 28 by folding limiter member 32 at 36 along its length l where it is reduced in thickness, in spaced relation to junction 34 with the load beam 14 to bring the limiter into the second position, defining an aperture 62 in the flexure 24 through which the limiter can be adjusted from its first to its second position, and providing a tongue engaging tip 58 on the limiter.

With reference to the several planes used in the invention method, the flexure cantilevered tongue 26 extends in a first plane t-t, limiter 28 is formed in the load beam 14 in a first position beyond operative association with the tongue and extends in a second plane r-r not parallel to the first plane, the load beam supports the flexure 24 with the limiter in the first position, and after static attitude adjusting the flexure, the limiter is brought into a second position in operative association with the tongue 24 and generally in a third plane s-s generally parallel with the tongue first plane t-t.

The invention thus provides novel and improved methods of manufacturing disk drive suspensions and improved disk drive suspensions in which static attitude adjustment does not compromise the limiter or the suspension, in which static attitude adjustment is conducted after pre-forming the load beam and limiter and before final forming of the suspension, and where a suspension having a flexure with a cantilevered tongue and a limiter initially out of operative association with the tongue has the limiter then adjusted into tongue operative association following static attitude adjustment of the suspension.

The foregoing objects are thus met.

I claim:

1. A method of manufacturing a disk drive suspension comprising a load beam and a flexure supported by said load beam, said flexure having a cantilevered tongue, including forming a limiter in said load beam in a first position beyond operative association with said tongue, supporting said flexure on said load beam with said limiter in said first position, static attitude adjusting said suspension, and thereafter bringing said limiter into a second position in operative association with said tongue.

2. The method according to claim 1, wherein said bringing said limiter into said second position includes adjusting said limiter along its length.

3. The method according to claim 1, including also providing a tongue engaging tip on said limiter.

4. The method according to claim 1, including also providing a tongue engaging tip on said limiter.

5. The method according to claim 2, wherein said limiter has a reduced thickness along its length and said adjusting comprises bending at said reduced thickness.

6. The method of claim 1, further comprising providing a reduced thickness along the length of said limiter at a reduced thickness locus, thereby rendering said limiter preferentially bendable into operative association with said tongue, and, after said static attitude adjusting, bending said limiter at said reduced thickness locus.

7. A method of manufacturing a disk drive suspension comprising a load beam and a flexure supported by said load beam, said flexure having a cantilevered tongue extending in a first plane, including forming a limiter in said load beam in a first position beyond operative association with said tongue and extending in a second plane not parallel to said first plane, supporting said flexure on said load beam with said limiter in said first position, static attitude adjusting said flexure, and thereafter bringing said limiter into a second position in operative association and generally in a third plane generally parallel with said tongue first plane.

8. The method according to claim 7, wherein said bringing said limiter into said second position includes adjusting said limiter along its length.

9. The method according to claim 8, wherein said limiter has a reduced thickness along its length and said adjusting comprises bending at said reduced thickness.

10. A disk drive suspension comprising a load beam having a base portion, a hinge portion and a beam portion, and a flexure supported by said beam portion having a cantilevered tongue, said suspension being subject to static attitude adjustment, and a limiter carried by said beam portion, said limiter being bent into operative association with said tongue at a location of reduced thickness along a length of said limiter, said location being of reduced thickness before any bending.

11. The disk drive suspension according to claim 10, in which said flexure is separately formed and weld-supported on said beam portion.

12. The disk drive suspension according to claim 10, in which said limiter is integrally formed from the material defining said beam portion.

13. The disk drive suspension according to claim 10, in which said flexure comprises a proximate region supported on said beam portion, a distal region, and left and right struts extending between said proximate and distal regions, said tongue being cantilevered from said distal region and defining a limiter contact locus.

14. The disk drive suspension according to claim 13, in which said limiter contact locus includes a limiter receiving opening.

15. The disk drive suspension according to claim 14, in which said limiter has a tip adapted to engage said limiter receiving opening.

16. A disk drive suspension comprising a load beam having a base portion, a hinge portion and a beam portion, and a flexure supported by said beam portion having a cantilevered tongue extending in a first plane, said suspension being subject to static attitude adjustment, a limiter carried by said beam portion in a first position in a second plane in which said limiter is out of operative association with said tongue in said tongue's first plane during said static attitude adjustment, said limiter being bent to a third plane and into operative association with said tongue in a second position at a location of reduced thickness along a length of said limiter, said third plane being generally parallel with said first plane, said location being of reduced thickness before any bending.

17. The disk drive suspension according to claim 16, in which said flexure is separately formed and weld-supported on said beam portion.

18. The disk drive suspension according to claim 16, in which said limiter is integrally formed from the material defining said beam portion.

19. The disk drive suspension according to claim 18, in which said flexure comprises a proximate region supported on said beam portion, a distal region, and left and right struts extending between said proximate and distal regions, said tongue being cantilevered from said distal region in said first plane and defining a limiter contact locus.

20. The disk drive suspension according to claim 19, in which said limiter contact locus includes a limiter receiving opening.

\* \* \* \* \*